United States Patent [19]

Valenzuela

[11] Patent Number: 5,138,569

[45] Date of Patent: Aug. 11, 1992

[54] DUAL TONE MULTI-FREQUENCY DETECTOR

[75] Inventor: Reinaldo Valenzuela, Wellesley, Mass.

[73] Assignee: Codex Corporation, Mansfield, Mass.

[21] Appl. No.: 452,247

[22] Filed: Dec. 18, 1989

[51] Int. Cl.⁵ .............................. G06F 15/31
[52] U.S. Cl. ........................ 364/724.09; 364/724.1
[58] Field of Search ............... 364/724.08, 724.09, 364/724.10, 724.11, 724.17; 381/43

[56] References Cited

U.S. PATENT DOCUMENTS 4,333,156 6/1982 Kurshan et al. ................ 364/724.09
4,348,735 9/1982 Hertz et al. .................... 364/724.09
4,361,875 11/1982 Hertz et al. .................... 364/724.08

OTHER PUBLICATIONS

S. L. Gay et al., "Algorithms For Multi-Channel DTMF Detection For The WE DSP32 Family", IEEE, 1989, pp. 1134–1137.

A. J. Grossman, "Snythesis of Tchebycheff Parameter Symmetrical Filters", Proceedings of the IRE, 1957, pp. 454–473.

A. G. Constantinides, "Spectral Transformations for Digital Filters", Proceedings of The Institution of Electrical Engineers, vol. 117, No. 8, pp. 1585–1590, (1970).

R. A. Valenzuela et al., "Digital Signal Processing Schemes for Efficient Interpolation and Decimation", IEE Proceedings, vol. 130, 1983, pp. 225–235.

R. A. Valenzuela Steude, "Techniques for Transmultiplexer Design", Thesis for Imperial Coll. of Sci. & Tech., 1982, pp. 1–211.

B. J. White et al., "A Monolithic Dual Tone Multifrequency Receiver", IEEE, vol. SC-14, No. 6, 1979, pp. 991–997.

Primary Examiner—Tan V. Mai
Attorney, Agent, or Firm—Darleen J. Stockley

[57] ABSTRACT

An apparatus for identifying a first tone and a second tone present in a dual-tone signal, the first tone being selected from a group of tones located within a low band and the second tone being selected from a second group of tones located within a high band, the low band and the high band each spanning a frequency range no greater than $f_0$ wide, the apparatus including a first filter for isolating and downconverting the portion of the dual-tone signal falling within the low band so that it lies within a low frequency range extending from $-f_0$ to $F_0$; and a second filter for isolating and downconverting the portion of the dual-tone signal falling within the high band so that it lies within the low frequency range.

23 Claims, 6 Drawing Sheets

DUAL TONE MULTI-FREQUENCY DETECTOR

BACKGROUND OF THE INVENTION

The invention relates to dual tone multi-frequency (DTMF) detection.

Dual tone multi-frequency reception and generation is an important function common to a large variety of telecommunication equipment. In specific applications, existing analog integrated circuits can be used for this purpose. However, a software implementation on a Digital Signal Processing (DSP) device is much more appropriate when a DSP is being used for other functions such as speech coding or echo cancellation as well as in the case in which many channels need to be served by common hardware.

DTMF signals consist of a low frequency tone and a high frequency tone and are typically used to represent the ten digits 0 to 9 and six other symbols, namely, *, #, A, B, C, and D. The frequency of the low tone can be 697 Hz, 770 Hz, 852 Hz or 941 Hz while the frequency of the high tone can be 1209 Hz, 1336 Hz, 1477 Hz or 1633 Hz depending on which of the symbols is being represented. Hence, the generation of DTMF signals simply implies the generation of two sinewaves at the frequencies given above. In contrast, the detection of DTMF signals is significantly more complex. As a rule, tones within +/−1.5% of the nominal frequency must be accepted while tones which deviate by more than +/3.5% of the nominal frequency must be rejected. In principle, a DTMF detector could be implemented as a filter bank followed by a decision stage. Although this is the preferred approach in analog integrated circuit implementations, the selectivity of the required filter bank makes direct software implementation impractical.

Other approaches proposed recently include a modified Groetzel algorithm as described by Mock in "Add DTMF Generation and Decoding to DSP μP Designs" EDN, Mar. 21, 1985, and a technique based on linear prediction as described by Gay et al. in "Algorithms For Multi-Channel DTMF Detection For The WEDSP32 Family", Proc. Int. Conf. Acoust., Speech, Signal Processing, Glasgow, Scotland, May 1989, pp. 1134–1137.

SUMMARY OF THE INVENTION

In general, in one aspect, the invention is an apparatus for identifying a first tone and a second tone present in a dual-tone signal, the first tone being selected from a group of tones located within a low band and the second tone being selected from a second group of tones located within a high band, the low band and the high band each spanning a frequency range no greater than $f_0$ wide. The apparatus includes a first filter for isolating and downconverting the portion of the dual-tone signal falling within the low band so that it lies within a low frequency range extending from $-f_0$ to $f_0$; and a second filter for isolating and downconverting the portion of the dual-tone signal falling within the high band so that it lies within the low frequency range.

Preferred embodiments include the following features. The apparatus includes a tone detector stage for detecting the presence of the first tone by detecting the downconverted first tone from the first filter and for detecting the presence of the second tone by detecting the downconverted second tone from the second filter. The first filter includes a first plurality of decimation filters arranged in cascade and the second filter includes a second plurality of decimation filters arranged in cascade. Each stage of the cascade of the first plurality of decimation filters and of the cascade of the second plurality of decimation filters decimates by a factor of two. The first and second plurality of decimation filters share at least one decimation filter in common. The decimation filters are recursive decimation filters each of which includes at least one all-pass section and some of them include two all-pass sections. The all-pass sections are canonical all-pass sections.

Preferred embodiments also include the following features. The first and second filters each includes a plurality of filter stages arranged in cascade, each of the stages after the first stage in each of the first and second filters using a sampling rate that is one half the sampling rate of the previous stage. The first filter stage of the first filter includes a third order half-band filter that is shared in common with the first filter stage of the second filter. At least one of the filter stages in the first filter and in the second filter comprises a fifth order half-band filter. At least one of the filter stages after the first filter stage in the first filter comprises a fifth order half-band filter that is shared in common with a corresponding filter stage of the second filter. The dual tone signal has a sample rate that is greater than $8f_0$ and both the first and second filters downconvert their respective band portions of the dual tone signal to a sample rate of $2f_0$.

The invention has the advantage of yielding very high selectivity at a reduced computational load in comparison to other approaches. All computations needed for the filter bank are performed at frequency of 1 KHz or less thereby decreasing the computational load by at least an 8:1 ratio in comparison to systems which perform the computations at the 8 KHz rate.

Other advantages and features will become apparent from the following description of the preferred embodiment and from the claims.

DESCRIPTION OF THE PREFERRED EMBODIMENT

STRUCTURE AND OPERATION

Figure 1:
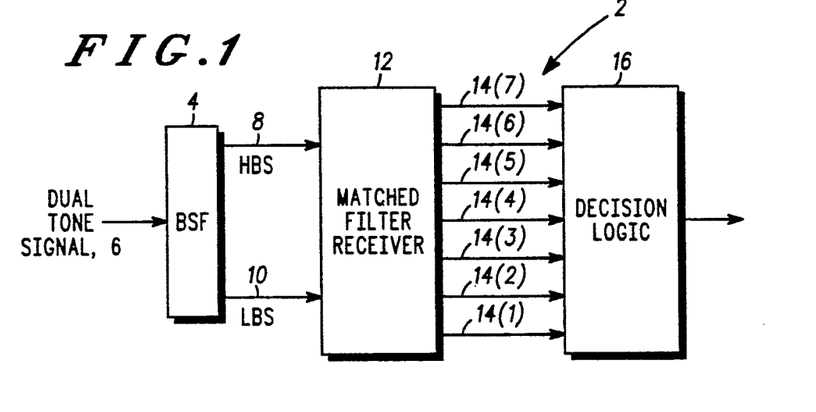
FIG. 1 is a block diagram of a DTMF tone detector.

Referring to FIG. 1, in a DTMF tone detector 2, a band separation filter BSF 4 samples a dual tone signal 6 at an 8 KHz rate and converts the sampled signal to a high band signal (HBS) 8 and a low band signal (LBS) 10, both of which have 1 KHz sample rates. Dual tone signal 6 consists of two tones, one tone selected from a low band group of four tones falling within the range of 500 Hz to 1000 Hz, namely, 697 Hz, 770 Hz, 852 Hz and 941 Hz, and the other tone selected from a high band group of three tones falling within the frequency range of 1000 Hz to 1500 Hz, namely, 1209 Hz, 1336 Hz and 1447 Hz. To generate high band signal 8, band separation filter 4 uses a cascade of recursive decimation filters (implemented as half-band filters) to both remove signal components having frequencies outside of the range of 1000 Hz to 1500 Hz and to downconvert the remaining signal components to the 0 to 500 Hz frequency range. Similarly, to generate low band signal 8, band separation filter 4 uses another set of recursive decimation filters to both remove signal components having frequencies outside of the range of 500 Hz to 1000 Hz and to downconvert the remaining signal components to the 0 to 500 Hz frequency range.

A matched filter receiver 12 samples the resulting high band and low band signals 8 and 10 at a 1 KHz sampling rate and generates seven output signals 14a–g, each representing the amount of signal power present at a corresponding one of each of the seven possible tone frequencies that may be present in dual tone signal 6. Finally, decision logic 16, which also operates at a 1 KHz rate, analyzes output signals 14a–g to determine which, if any, of the possible tones are present.

Figure 2:
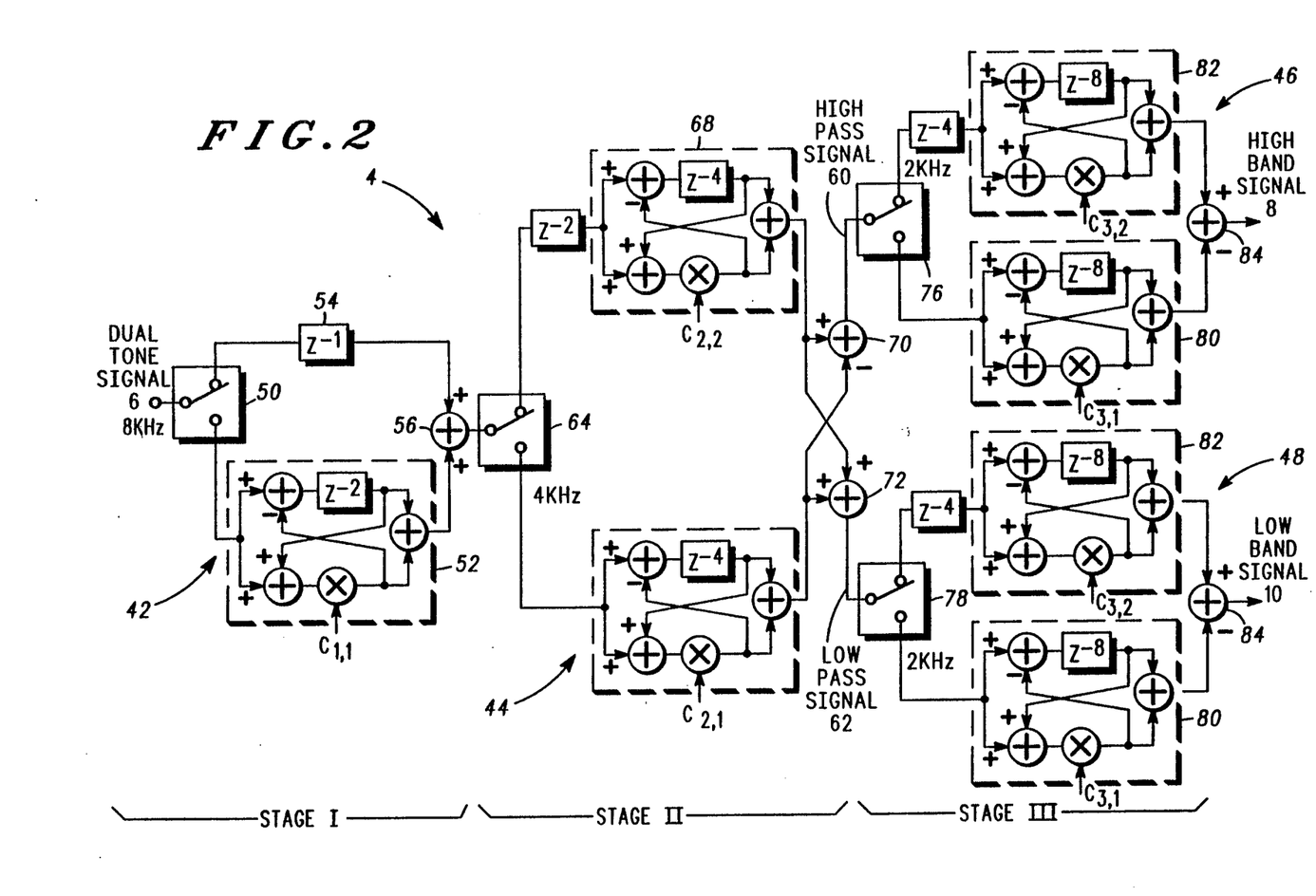
FIG. 2 is a block diagram of the band separation filter (BSF) shown in FIG. 1.
Figure 3:
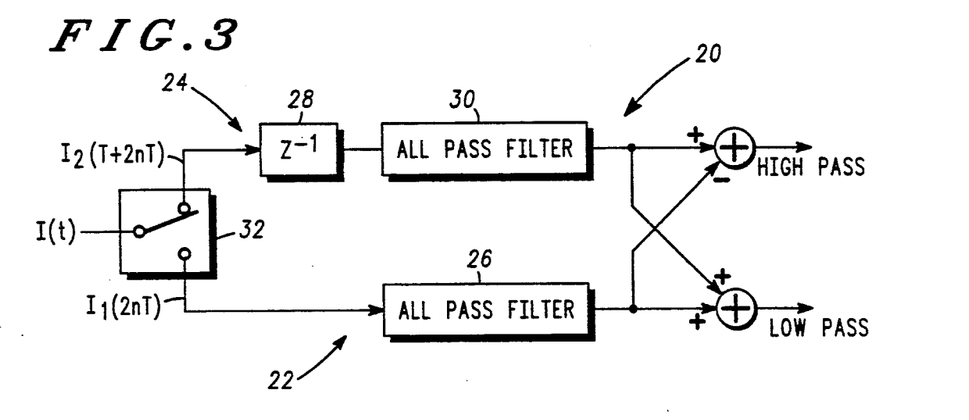
FIG. 3 is a block diagram of a decimating half-band filter.

As shown in FIG. 2, band separation filter 4 has three stages identified as Stage I, Stage II and Stage III. A decimating half-band filter structure 20, such as is shown in FIG. 3, is the basic building block for each of the stages. The structure and operation of this basic building block will first be described, followed by a description of the structure and operation of band separation filter 4.

As shown in FIG. 3, half-band filter 20 has two branches, namely, a lower branch 22 and an upper branch 24. Lower branch 22 includes a canonical all pass filter section 26 that has the following transfer function:

$$H_1(z) = \prod_{k=1}^{k_0} \frac{a_{0,k} + z^{-2}}{1 + a_{0,k}z^{-2}}. \tag{1}$$

Whereas, upper branch 24 includes a delay element 28 (generally designated by $z^{-1}$) in series with another canonical all pass filter section 30 having a transfer function of the same general form as that of all pass filter section 26, namely, $$H_u(z) = \prod_{k=1}^{k_1} \frac{a_{1,k} + z^{-2}}{1 + a_{1,k}z^{-2}} \tag{2}$$

In half-band filter 20, sampling logic 32 samples an input signal I(t) at a sampling rate 1/T and generates a first half rate sequence $I_1(2nT)$ and a second half rate sequence $I_2(T+2nT)$ where n is an integer index. First half rate sequence $I_1(2nT)$, which consists of alternate samples of the input signal I(t), is sent to lower branch 22, whereas second half rate sequence $I_2(T+2nT)$, which consists of the remaining samples of input signal I(t), is sent to upper branch 24.

The outputs of all pass sections 26 and 30 are inphase over the lower half-band and out-of-phase over the upper half-band. Consequently, a low-pass half-band filter is realized by adding the outputs of all pass sections 26 and 30 and, conversely, a high-pass half-band filter is realized by subtracting the outputs of all pass sections 26 and 30. The resulting half-band filter 20 has the following z-domain transfer function:

$$H(z) = \prod_{k=1}^{k_0} \frac{a_{0,k} + z^{-2}}{1 + a_{0,k}z^{-2}} \pm z^{-1} \prod_{k=1}^{k_1} \frac{a_{1,k} + z^{-2}}{1 + a_{1,k}z^{-2}} \tag{3}$$

where $K=k_0+k_1$ is the total number of coefficients, $N=2K+1$ is the filter order and where the sign on the second term is positive if the outputs of the two branches are added (to achieve a low pass response) and it is negative if they are subtracted (to achieve a high pass response).

Figure 4:
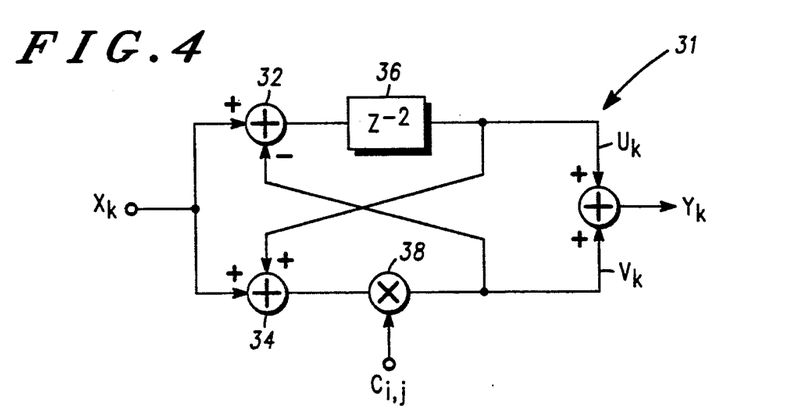
FIG. 4 is a block diagram of a canonical all-pass section.

In the described embodiment, canonical all pass sections 26 and 30 are implemented as shown functionally in FIG. 4. An all pass section 31 processes an input sequence $X_k$ to generate a first branch sequence $U_k$ and a second branch sequence $V_k$, which are then added to yield an output sequence $Y_k$. More specifically, in all pass section 31, second branch sequence $V_k$ is subtracted from input sequence $X_k$ and the result is sent to a second order delay element 36 (designated as $Z^{-2}$) which generates first branch sequence $U_k$. Also, input sequence $X_k$ is added to first branch sequence $U_k$ in an adder 34 and the result is multiplied by a coefficient, $c_{i,j}$, in a multiplier 38 to generate second branch sequence $V_k$. The resulting transfer function is:

$$H(z) = \frac{c_{i,j} + z^{-2}}{1 + c_{i,j}z^{-2}} \tag{4}$$

At least two design methods are available for Eq. 3, one based upon non-linear optimization techniques and the other derived from classical analogue filter design techniques. In accordance with the first approach, the design problem presented by Eq. 3 can be stated as follows: find the set of coefficients $\{a_{i,k}\}$ which minimize the peak stopband ripple for a given transition bandwidth $w_t$. This may be achieved computationally by using appropriate software. Indeed, a non-linear least-squares optimization technique based on a corrected Gauss-Newton method has been used to minimize the sum of the squares of the frequency response evaluated on a dense grid of points in the interval of interest. See, for example, Gill et al., "Algorithms for the solution of the non-linear least square problem", SIAM. Numerical Analysis, Vol. 15, pp. 977–992 (1978).

The above-described structure for the half-band filters simulates a doubly-terminated lossless lattice network through the wave linear transformation and can be shown to implement a sub-set of elliptic transfer functions. Thus, an analytic solution exists for the set of coefficients that yields the optimum solution in the equiripple sense. The theory and design of electrically symmetrical reactive (lossless) networks with particular attention to filters that exhibit Chebyshev-type performance in the passband and stopband has been comprehensively covered by Darlington in "Synthesis of reactances 4-poles", J. Material Science, Vol 18, pp. 237–253 (1939) and by Grossman in "Synthesis of Tchebycheff parameter symmetric filters", Proc. IRE, Vol. 45, pp.454–473 (1957). This work together with the well known bilinear transformation for the translation between the analogue and digital domains and the frequency transformations due to Constantinides (in "Special transformations for digital filters", Proc. IEE, Vol. 117, No. 8, pp. 1585-1590 (1970)) provide a very powerful method for the design of digital elliptic filters.

Indeed, this framework was used by R. A. Valenzuela et al. in "Digital Signal Processing Schemes for Efficient Interpolation and Decimation", IEE Proceedings, Vol. 130, Pt. G, No. 6, December 1983, pp. 225–235, to develop a step by step analytic design method for the optimal design of these half-band recursive decimators. According to the design method, if any four of the five parameters, n, the filter order, $d_p$, $d_s$, $f_p$ and $f_s$, the passband ripple and cutoff frequencies, is arbitrarily set to any prescribed value, then the remaining parameter and the filter response is completely and uniquely specified.

In addition, the stopband attenuation attained for a given order and transition bandwidth can be readily determined graphically. For example, R. A. Valenzuela et al., "Digital Signal Processing Schemes For Efficient Interpolation and Decimation", IEE Proceedings, Vol. 130, Pt. G, No. 6, December 1983, pp. 225–235, incorporated herein by reference.

Figure 5A:
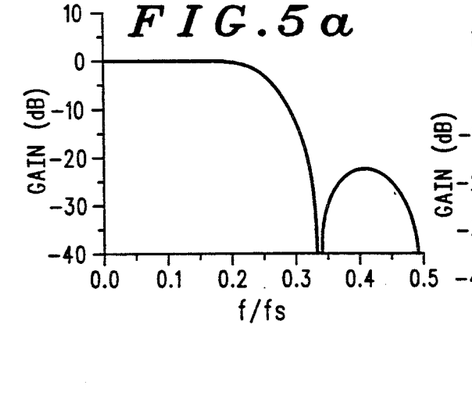
FIG. 5a is the frequency response of Stage I of the band separation filter shown in FIG. 2.

Returning to FIG. 2, stage I employs a third order half-band filter 42 and the remaining stages II and III employ fifth order half-band filters 44, 46, and 48. In half-band filter 42 of stage I, sampling logic 50 samples dual tone signal 6 at an 8 KHz rate and generates two half-rate sequences, each of which passes to a different branch of half-band filter 42. One branch of half-band filter 42 includes an all pass section 52 with a coefficient value $C_{11}=0.498124$. The other branch includes a delay element 54. The signals from both branches are added by an adder 56 to yield a low pass filter transfer function having a transition band located around 2 KHz. The transition bandwidth for stage I is about 1.046 KHz and the frequency response for stage I is as shown in FIG. 5a where the frequency axis is in normalized frequency units (i.e., $f/f_s$ where $f_s$ equals 8 KHz).

In stage II, fifth order half-band filter 44 generates two output signals, namely, a high pass signal 60 and a low pass signal 62. Sampling logic 64 samples the output signal from stage I at a 4 KHz rate and generates two half-rate sequences, each of which passes to a different branch of half-band filter 44. One branch of half-band filter 44 includes all pass section 66 with a coefficient value $C_{21}=0.409710$ and the other branch includes all pass section 68 with a coefficient value $C_{22}=0.857883$. The outputs of all pass sections 66 and 68 are subtracted in an adder 70 to produce high pass signal 60 and they are added in an adder 72 to produce low pass signal 62. The transition band is located at about 1 KHz so that frequency components above 1 KHz (including the high band components of the dual tone signal) are substantially attenuated in low-pass signal 62 and frequency components below 1 KHz (including the low band signal components of the dual tone signal) are substantially attenuated in high-pass signal 60.

Fifth order recursive half-band filter 44 has a transition bandwidth of about 0.236 KHz. The beginning response of its low pass transfer function is shown in FIG. 5b and the frequency response of its high pass transfer function is shown in FIG. 5c.

Finally, in stage III, fifth order, half-band filters 46 and 48 are identical and each of them processes a corresponding one of low-pass and high pass signals 62 and 60 from stage II. In half-band filter 46, sampling logic 76 samples high-pass signal 60 at a 2 KHz rate and generates two half-rate sequences, each of which passes to a different branch of that filter. Similarly, in half-band filter 48, sampling logic 78 samples low-pass signal 62 also at a 2 KHz rate and generates two half-rate sequences, each of which passes to a different branch of that filter. One branch of each of half-band filters 46 and 48 includes an all pass section 80 with a coefficient value $C_{31}=0.445939$ and the other branch includes all pass section 86 with a coefficient value $C_{32}=0.879007$. In each filter 46 and 48, the outputs of all pass sections 80 and 82 are subtracted by an adder 84 to produce transfer characteristics of a high-pass filter having a transition band located at about 0.5 KHz. Filter 46 produces high-band signal 8 by substantially attenuating the frequency components of high-pass signal 60 that lie below 0.5 KHz and filter 48 produces low-band signal 10 by substantially attenuating the frequency components of low-pass signal 62 that lie below 0.5 KHz.

Figures 5B, 5E:
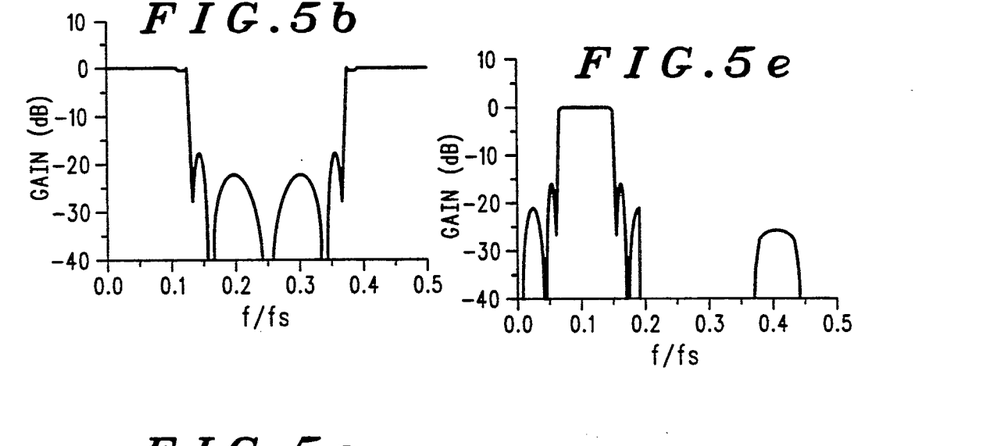
FIG. 5b is the frequency response of the low pass portion of Stage II of the band separation filter shown in FIG. 2.
FIGS. 5e and 5f are the composite frequency responses of the low pass portions and the high pass portions, respectively, of the band separation filter shown in FIG. 2.
Figure 5C:
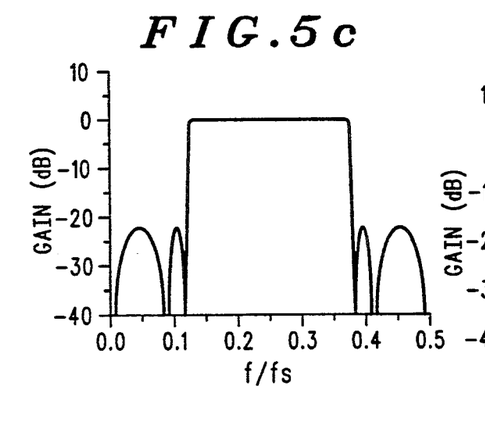
FIG. 5c is the frequency response of the high pass portion of Stage II of the band separation filter shown in FIG. 2.
Figure 5D:
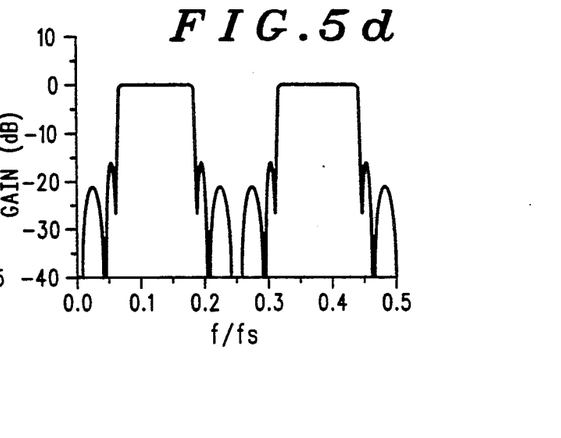
FIG. 5d is the frequency response of Stage III of the band separation filter shown in FIG. 2.

Each of the fifth order half-band filters 46 and 48 used in stage III for the selection of both the low band and the high band frequency components has a transition bandwidth of about 0.184 KHz and a frequency response as shown in FIG. 5d.

Figure 5F:
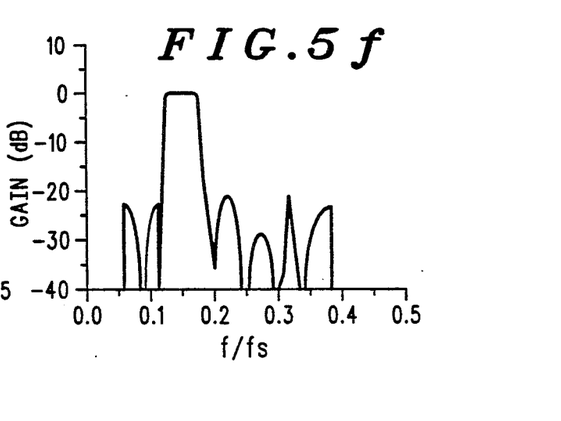

The composite frequency responses for the low-band portion and for the high-band portion of band separation filter 4 are shown in FIGS. 5e and 5f, respectively. Note that the passband responses are flat and out of band rejection is greater than 20 db. These composite responses ensure that unwanted spectral lines resulting from the spectral fold over associated with the sampling rate down-conversion from 8 KHz to 1 KHz are below the noise level so as to provide adequate signal to noise ratio for subsequent frequency detection.

Figure 6A:
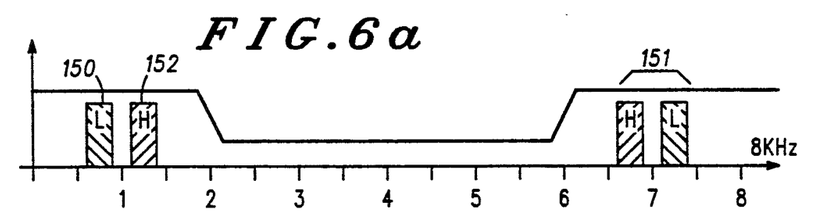
FIGS. 6a–g summarize the operation of each of the Stages shown in FIG. 2.
Figure 6B:
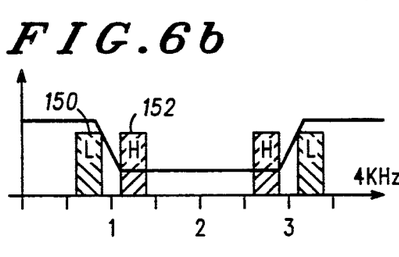
Figure 6C:
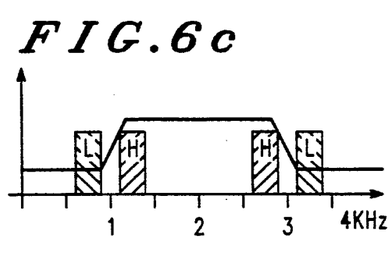
Figure 6D:
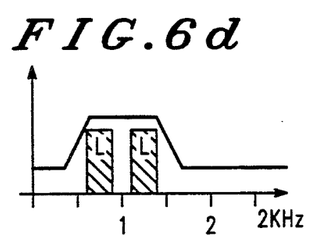
Figures 6E, 6F:
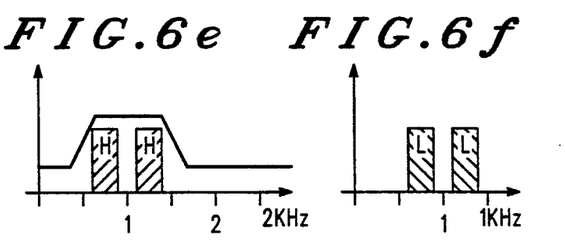
Figure 6G:
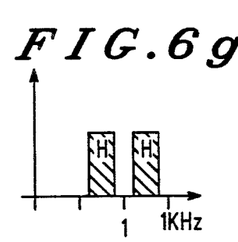

FIGS. 6a-g summarize the operation of each of Stages I, II and II of band separation filter 4. The dual tone signal spectrum is selected from a low band group 150 and an high band group 152. Stage I removes the 2.0 to 4.0 KHz band and decimates down to the sampling rate of 4 KHz (FIG. 6a). The low pass version of Stage II removes the 1.0 to 2.0 KHz frequency band, thereby selecting tones from low band group 150 (FIG. 6b). The high pass version of Stage II removes the 0.0 to 1.0 Khz frequency band, thereby selecting tones from the high band group 152 (FIG. 6c). The output of Stage II is sampled at 2 KHz. Finally, for both outputs of Stage II (i.e., the low pass signal and the high pass signal -see FIG. 2), Stage III removes the 0.0 to 0.5 KHz frequency band prior to decimation to a 1 KHz sampling rate (FIGS. 6d–e). FIGS. 6f and 6g show the outputs from the band separation filter, namely, low band signal 10 and high band signal 8. Thus, high band tones, namely, 1209 Hz, 1336 Hz and 1477 Hz, are shifted to 209 Hz, 336 Hz and 477 Hz, respectively. And low band tones, namely 697 Hz, 770 Hz, 852 Hz and 941 Hz, are shifted to 303 Hz, 230 Hz, 148 Hz and 59 Hz, respectively. Note that the low band signal is frequency reversed.

Also note that, although not shown, the frequency spectrum is reflected about the f=0 axis so that frequency components also appear at corresponding negative frequencies. These reflected frequency components are implied by the upper bands shown in FIGS. 6a-g. For example, refer to upper band tones 151 shown in FIG. 6a. It is possible to downconvert the low band tones so that they lie in a frequency range extending from −250 to 250 Hz. in which case there will be no mirror replica of the frequencies on the negative frequency axis. In that case, one would need a complex number to represent each frequency component.

Figure 7:
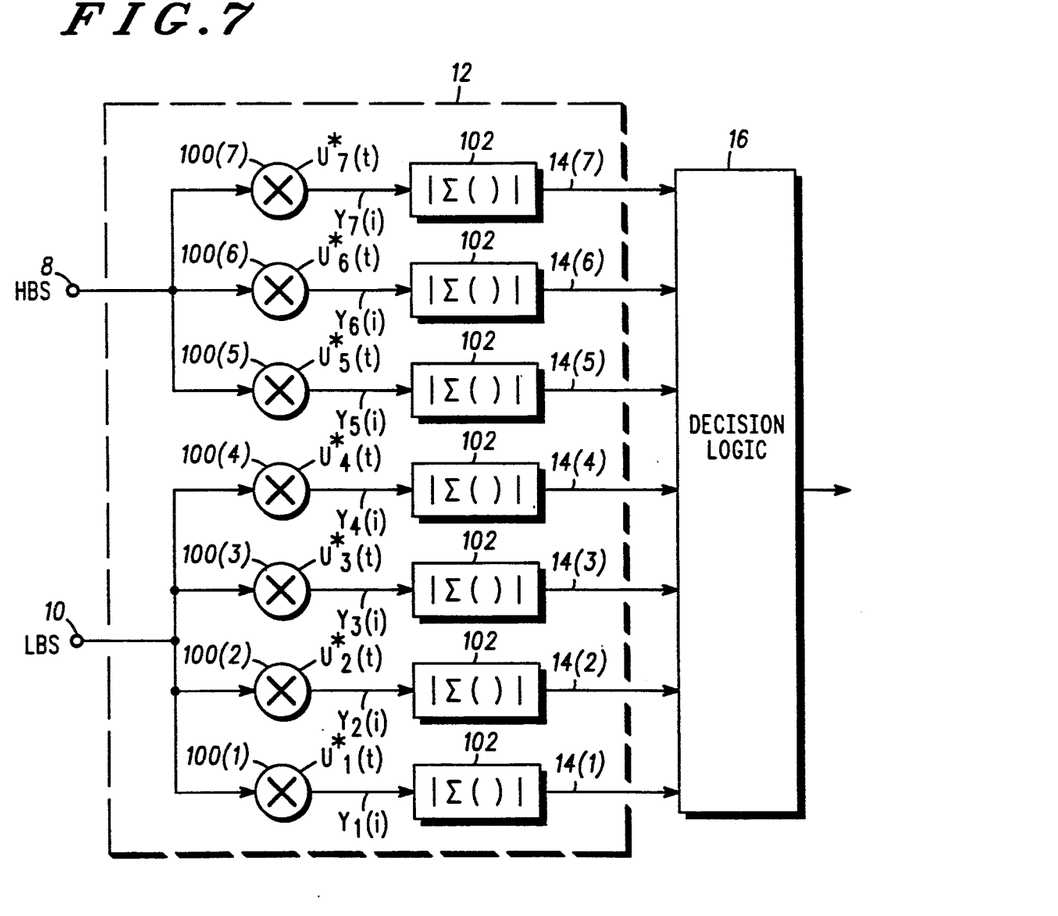
FIG. 7 is a block diagram showing details of the matched filter receiver shown in FIG. 1.

High band signal 8 and low band signal 10 pass to matched filter receiver 12, shown in greater detail in FIG. 7. Matched filter receiver 12 includes seven correlators 100(1-7), four of which (i.e., correlators 100(1-4)) receive low band signal 10 and three of which (i.e., correlators 100(5-7)) receive high band signal 8. Each correlator 100 computes a complex correlation of its received signal with and a different corresponding signaling waveform $u_k(t)$, where m is an integer index ranging from 1 to 7. For the purpose of detecting DTMF tones, the 7 signaling waveforms are given by complex exponentials, $u_k(t) = e^{jw_k t}$, where $w_k = 2\pi f_k$ and $f_k$ are the images of nominal DTMF frequencies falling within the frequency range of 0.0 to 0.5 KHz. Note that complex correlations are computed due to the lack of phase information for the high and low band signals 8 and 10.

Each of the correlators 100 produces a corresponding output signals $y_k(i)$ equal to:

$$y_k(i) = \sum_{n=0}^{N-1} x_j(i-n) e^{j[(i-n)2\pi f_k/f_s]}, \quad (5)$$

where $f_s$ is the sample rate, N, the symbol period, is the number of samples in the correlation window, $x_j(i)$ are the outputs from the band separation filters, with j=1 for k in (1,2,3,4) for the low band filter, and j=2 for k in (5,6,7), for the high band filter, and i is an integer index identifying the correlation window. The symbol period is set as the shortest correlation window which gives sufficient rejection of unwanted tones.

To reduce the computational burden, matched filter receiver 12 computes equation 5 recursively. That is, $$y_k(i) = y_k(i-1) + x(i)e^{j2\pi f_k/f_s} - x(i-N+2)e^{j(i-N+2)2\pi f_k/f_s} \quad (6)$$

This requires only four multiplications and four additions at a rate of 1 KHz for both the inphase and the quadrature components.

To eliminate the phase information in the correlator output signals, matched filter receiver 12 includes computational elements 102 each of which generates a corresponding one of matched filter output signals 14(1-7) by computing the magnitude squared of a corresponding complex correlator output signal $y_k(i)$. These computations require only two additional multiplications and one more addition. Thus, a total of 3.75 multiplications and 3.625 additions per input sample are needed for the computation of all seven matched filter outputs.

Figure 8A:
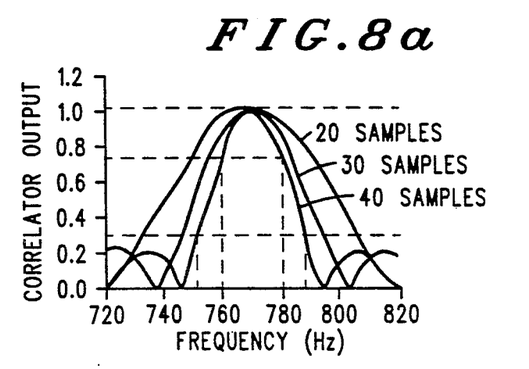
FIG. 8a is a graph showing the selectivity of the matched filter receiver.
Figure 8B:
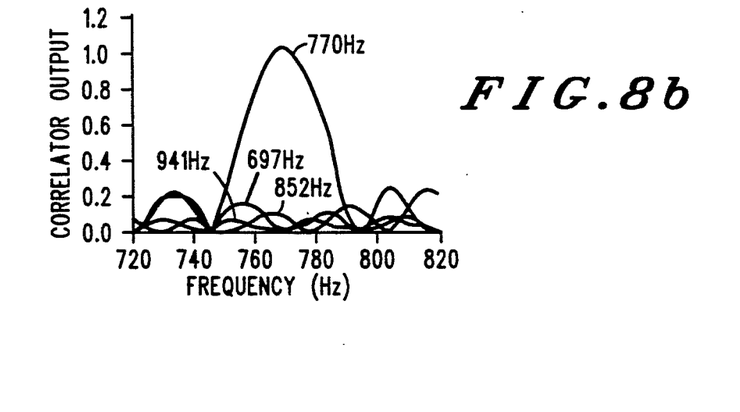
FIG. 8b is another graph showing the performance of the matched filter receiver.

FIG. 8a shows the selectivity of the correlation peak for the 770 Hz tone detector portion of matched filter receiver 12 using a window length of 30, 40, and 50 samples. In order to reject tones at a frequency 3.5% from the nominal frequency, a correlation window length of 40 samples is needed. FIG. 8b shows the four low band output signals from correlators 100(1-4) for an input tone in the vicinity of the 770 Hz.

For valid tones, i.e. with less than 1.5% frequency error, the magnitude of the correlation is in the range 0.75 to 1.0 and for unacceptable tones, with a frequency error greater than 3.5% the magnitude of the correlation coefficient is always less than 0.3. Thus, decision logic 16 can be based on a single threshold at around 0.5 or a three zone algorithm can be implemented, in which an "uncertain" outcome is allowed in addition to positive detection and rejection.

Figure 9:
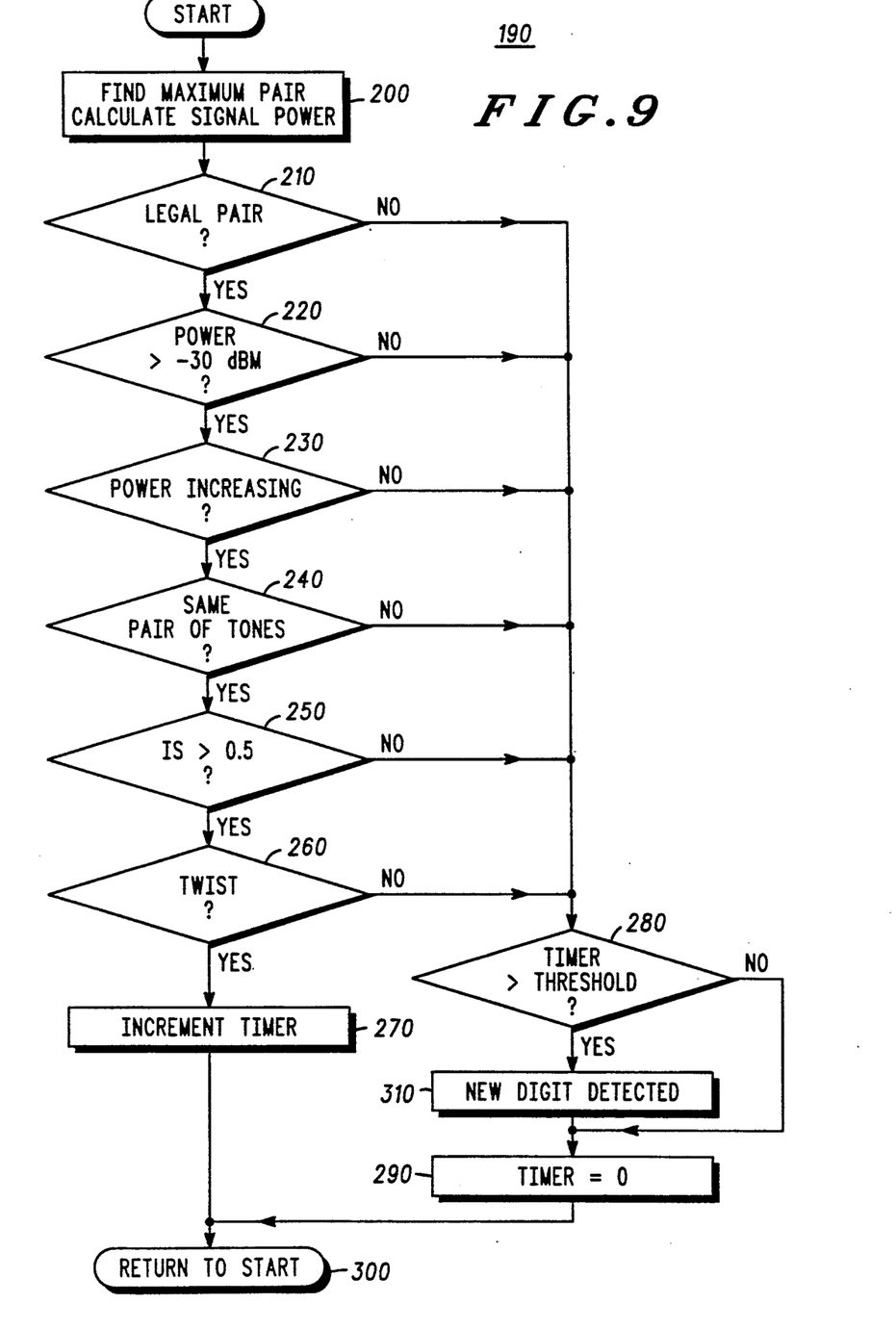
FIG. 9 is a flow chart of the decision algorithm that is implemented by the decision logic.

Decision logic 16, which employs a decision algorithm 196, as shown in FIG. 9, tests the seven magnitude squared output signals of matched filter receiver 12 to determine whether a DTMF signal is present. Decision algorithm 190 includes an ordered sequence of tests that is repeated for each new sample generated by matched filter receiver 12. Initially, decision logic 16 identifies the two largest signals among the seven output signals, computes the total signal power of the identified pair (designated as S) and computes the total signal power of all seven signals from matched filter receiver 12 (designated as P) (step 200). Logic 16 computes signal power by summing the magnitude squared values for the relevant signals.

Next, logic 16 determines whether the identified pair of signals is a legal dual tone signal (step 210). In other words, does the identified pair include both a low band tone and a high band tone? If it does, then logic 16 determines whether the signal power S of the identified pair exceeds −30 dBm (where 0 dBm corresponds to one milliwatt) (step 220).

If S is sufficiently large, logic 16 determines whether the signal power of the current identified pair is smaller than the signal power of the identified pair for the immediately preceding sample (step 230). If the signal power is decreasing, that generally means the identified pair has been present for a long enough period of time to make a decision as to whether it is a valid dual tone signal and what digit it represents.

If S is still increasing, logic 16 then determines whether the current identified pair includes the same tones as the previous identified pair (step 240). If the identified pair has not changed from the previous sample, logic 16 computes a signal-to-noise ratio for the identified tones (i.e., S/P) and determines whether it exceeds 0.5 (step 250). Finally, logic 16 determines whether the twist of the identified pair falls within an acceptable range (step 260). Twist is defined as the ratio of the power in the high band tone to the power in the low band tone. If the twist is greater than −8 dB but less than +4 dB, logic 16 increments a timer to indicate that a predetermined amount of time has passed since the previous sample.

If the outcome of any of the tests in steps 210 through 260 is negative, decision logic 16 branches to step 280 in which the timer is compared to a threshold which is equivalent to 40 milliseconds. If the timer does not exceed the threshold, indicating that the identified pair did not satisfy all of the tests in steps 210 through 260 for at least 40 ms, then logic 16 resets the timer to zero (step 290) and returns to the start (step 300) to wait for the next sample. In other words, a valid dual tone (i.e., a new digit) was not detected.

On the other hand, if the timer does exceed the threshold, decision logic 16 indicates that a new digit was detected and generates the appropriate digit as its output.

Neglecting the computational burden of decision logic 16, the total amount of computations required is 5.25 multiplications and 11.375 additions at the input sample rate of 8 KHz. It should be noted that the decision variables are updated at a rate of 1 KHz, due to the 1:8 sample rate down conversion. This may prove to be more frequent than necessary, thus it is possible to reduce the computational burden even more by computing the correlation variables and executing decision logic at an even lower rate.

Other embodiments are within the following claims.

What is claimed is:

1. An apparatus for identifying a first tone and a second tone present in a signal, the first tone being selected from a group of tones located within a low band and the second tone being selected from a second group of tones located within a high band, the low band and the high band each spanning a different frequency range and each having a width no greater then $f_0$, the apparatus comprising:
   a first filter receiving said signal, said first filter for isolating and downconverting the portion of said signal falling within the low band so that it lies within a low frequency range extending form $-f_0$ to $f_0$ wherein the first filter comprises a first plurality of decimation filter stages arranged in cascade; and
   a second filter reseiving said signal, said second filter for isolating and dowconverting the portion of said signal falling within the high band so that it lies within the low frequency range, wherein the second filter comprises a second plurality of decimation filter stages arranged in cascade.

2. The apparatus of claim 1 further comprising a tone detector stage for detecting the presence of the first tone by detecting the downconverted first tone from the first filter and for detecting the presence of the second tone by detecting the downconverted second tone from the second filter.

3. The apparatus of claim 1 wherein each stage of the cascade of said first plurality of decimation filter stages decimates by a factor of two.

4. The apparatus of claim 1 wherein each stage of the cascade of said second plurality of decimation filter stages share at least one decimation filter in common.

5. The apparatus of claim 1 wherein the first and second plurality of decimation filter stages share at least one decimation in common.

6. The apparatus of claim 1 wherein the decimation filters are recursive decimation filters.

7. The apparatus of claim 1 wherein each of the decimation filters comprises at least one all-pass section.

8. The apparatus of claim 7 wherein some of the decimation filters comprise two all-pass sections.

9. The apparatus of claim 8 wherein the all-pass sections are canonical all-pass sections.

10. The apparatus of claim 1 wherein the first and second filters each comprise a plurality of filter stages arranged in cascade, each of said stages after the first stage in each of said first and second filters using a sampling rate that is one half the sampling rate of the previous stage.

11. The apparatus of claim 10 wherein the first filter stage of the first filter and the first filter stage of the second filter each comprises a third order half-band filter.

12. The apparatus of claim 11 wherein the first filter stage of the first filter comprises a half-band filter that is shared in common with the first filter stage of the second filter.

13. The apparatus of claim 11 wherein at least one of the filter stages after the first filter stage in the first filter comprises a fifth order half-band filter that is shared in common with a corresponding filter stage of the second filter.

14. The apparatus of claim 10 wherein at least one of the filter stages in the first filter and in the second filter comprises a fifth order half-band filter.

15. The apparatus of claim 1 wherein the dual tone signal has a sample rate that is greater than $8f_0$ and wherein the first filter downconverts said low band portion of the dual tone signal to a sample rate of $2f_0$.

16. The apparatus of claim 15 wherein the second filter downconverts said high band portion of the dual tone signal to a sample rate of $2f_0$.

17. The apparatus of claim 15 wherein the second filter downconverts said high band portion of the dual tone signal to sample rate o $2f_0$.

18. The apparatus of claim 1 wherein the dual tone signal has a sample rate that is at least as great as $16f_0$ and wherein the first filter downconverts said low band portion of the dual tone signal to a sample rate of $2f_0$.

19. The apparatus of claim 1 wherein said low band and said high band are non-overlapping.

20. The apparatus of claim 1 wherein said low band does not overlap said low frequency range.

21. The apparatus of claim 1 where in $f_0$ is less than about 500 Hz.

22. The apparatus of claim 1 wherein said low band extends from about 500 Hz to about 1000 Hz, said high band extends from about 1000 Hz to about 155 Hz and said low frequency range extends from about $-500$ Hz to about 500 Hz.

23. A method for identifying a first tone and a second tone present in a signal, the first tone being selected from a group of tones located within a low band and the second tone being selected from a second group of tones located within a high band, the low band and the high band each spanning a different frequency range and each having a width no greater than $f_0$, the method comprising:
   isolating and downconverting the portion of said signal falling within the low band so that it lies within a low frequency extending from $-f_0$ to $f_0$;
   isolating and downconverting the portion of said signal falling within the high band so that it lies within the low frequency range;
   detecting a presence of the first tone by detecting the downconverted first tone within the downconverted low band portion of said signal utilizing a first filter, wherein the first filter comprises a first plurality of decimation filter stages arranged in cascade; and
   detecting a presence of the second tone by detecting the downconverted second tone within the downconverted high band portion of said signal utilizing a second filter, wherein the second filter comprises a second plurality of decimation filter stages arrange in cascade.

* * * * *